July 7, 1970     R. L. COOK     3,519,529

PUNCTURE RESISTANT LAMINATE WITH CRINKLED FILM LAYER

Filed Feb. 13, 1967

INVENTOR
RICHARD L. COOK

BY:
Oldham & Oldham
ATTORNEYS

United States Patent Office 3,519,529
Patented July 7, 1970

3,519,529
PUNCTURE RESISTANT LAMINATE WITH CRINKLED FILM LAYER
Richard L. Cook, Phoenix, Ariz., assignor to Goodyear Aerospace Corporation, Akron, Ohio, a corporation of Delaware
Filed Feb. 13, 1967, Ser. No. 615,639
Int. Cl. B32b 3/28; B64d 37/00; F41h 5/00
U.S. Cl. 161—128                              6 Claims

ABSTRACT OF THE DISCLOSURE

A puncture resistant material particularly designed for use with liquid containing fuel tanks is provided which utilizes a thin plastic film crinkled up into a greatly reduced area, but being essentially flat and retained in this size and shape between a layer of felt or other similar type material, and some smooth non-permeable membrane to hold the crinkled film in its crinkled relation adjacent the felt. This structure achieves an energy absorbing action to spread the kinetic energy of impact at a specific point over a very large area thus defeating puncturing of the material.

---

This invention relates to a puncture resistant material particularly designed for use with liquid containing fuel tanks which can be used alone, or in a laminate combination with greatly increased resistance to puncturing by the forces caused in vehicle crashes, or by flying projectiles.

Heretofore, it has been well known that rupturing fuel tanks in vehicles which are subject to burst into flame upon rupturing present an extreme fire hazard and great danger to the occupant of the vehicle. These ruptures or breaks occur normally during puncturing caused by a crash of the vehicle, or in certain military situations where small arms projectiles effectively puncture the tanks. Many attempts have been made to meet and overcome this problem to increase the safety to the occupants of the vehicle. However, none have been fully successful when having to meet the requirements of lightweight, great strength, and low cost. Certainly, these same puncture resistant requirements are also needed in other applications besides liquid fuel tanks, but this is the most practical and immediate requirement at this time.

Therefore, it is the general object of the present invention to improve upon the prior art practices and meet the requirements thereof providing a high strength puncture resistant material alone or in laminated form which may be used with fuel tanks to greatly reduce the possibility of puncture thereof upon crashing, or by projections of various types, thus greatly enhancing the safety of the occupant of the particular vehicle.

A further object of the invention is to provide a puncture resistant material which in effect utilizes an energy absorbing action to spread the kinetic energy at a specific point of impact over a very large area thus defeating the attempt of the particular projection to puncture the material.

A further object of the invention is to provide a puncture resistant material which is a flat film crinkled up into a greatly reduced area, but still being flat and retained in this size and shape whereby when a projection would hit this area, it will expand multi-laterally without rupturing thereby spreading the kinetic energy of impact over a very large area and thus defeating the penetration properties of the projection.

The aforesaid objects of the invention and other objects which will become apparent as the description proceeds are achieved in the preferred embodiment of the invention for liquid fuel tank construction by providing in an impact resistant laminate the combination of an outer layer of a ballistic felt, a crinkled flexible non-permeable film capable of multi-lateral expansion to match that of the felt under a local impact positioned adjacent the felt, and a smooth inner non-permeable membrane covering the crinkled film and holding it in crinkled relation adjacent the felt.

For a better understanding of the invention reference should be had to the accompanying drawings wherein.

Figure 3:
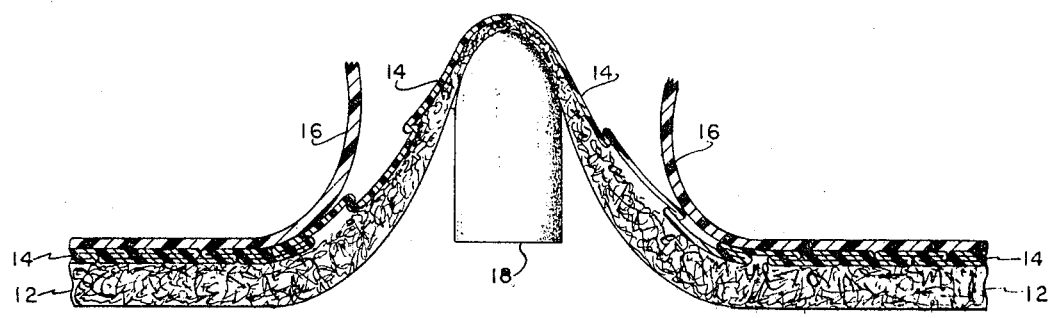
Figure 4:
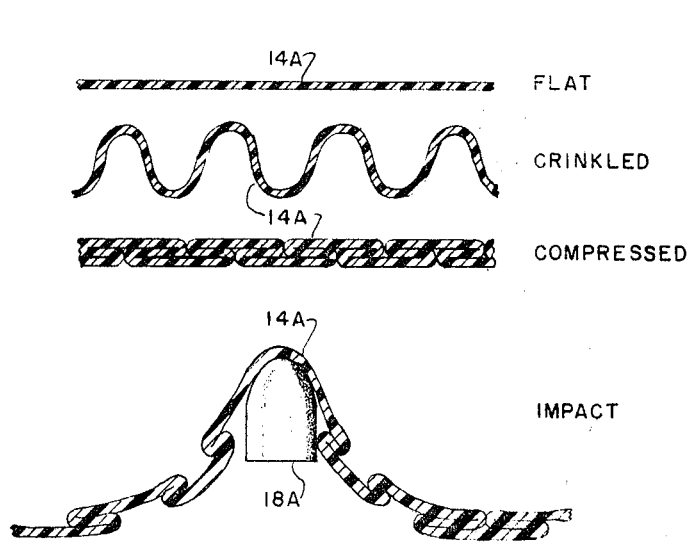

FIG. 3 is a greatly enlarged cross sectional view of a projectile impacting and having the kinetic energy of the impaction thereof spread oper a very large portion of the laminate because of the multilateral spreading characteristics thereof; and FIG. 4 is a greatly enlarged cross sectional sequential view showing how the crinkled layer is fabricated beginning with a flat sheet and progressing to the thickened crinkled, and finally the compressed crinkled, and how the final crinkled layer spreads out upon impact of the projectile.

Figures 1, 2:
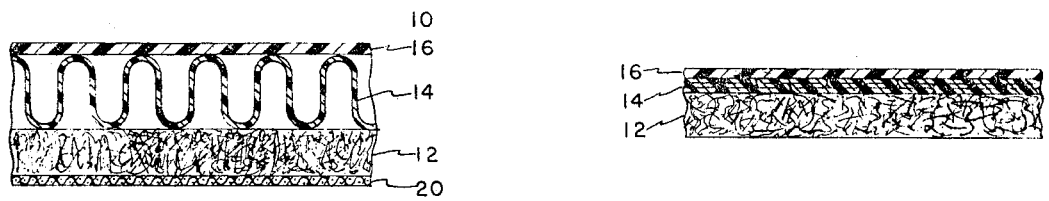
FIG. 1 is a greatly enlarged cross sectional view of the composite laminate of the invention.
FIG. 2 is a greatly enlarged cross sectional view of the laminate of FIG. 1 with the crinkled portion squashed or flattened to reduce the overall thickness of the laminate.

With reference to the form of the invention illustrated in FIG. 1 of the drawings, the numeral 10 indicates generally a puncture resistant laminate comprising an outer layer of ballistic nylon felt 12 designed for burst and puncture resistance. The felt lining 12 is a standard material typically made from a fine nylon filament swirled and needled in a manner typical of felting operations. For such felt to have a ballistic qualification, it must be approved by the Quartermaster Research & Eng. Institute, a government facility operating in Massachusetts. A particular felt qualifying as ballistic is made by Felter's Company of Millbury, Mass. Typically, the felt used in this laminate may be anywhere from approximately ⅛ inch thickness to about 1 inch in thickness, or may be defined in terms of weight per square foot, and hence may fall in a range from between about .05 lb. per sq. ft. to about 1.0 lb. per. sq. ft. While the state of the art today finds that a nylon fielt offers the best loading characteristics for various impact velocities, and thus is the best ballistic feld, it is believed that in the future certain other materials may be equal or better to a nylon felt. For erample, polypropylene filaments may be suitable either in a felt configuration, or as a suitable loosely woven material to present desirable stress strain characteristics for various impact velocities.

The next layer of the laminate is made from a crinkled flexible, non-permeable film 14. It is effectively crinkled, wadded, folded, or otherwise manipulated to a reduced size substantially flat condition so that it will be capable of considerable multi-lateral expansion to match the expansion characteristics of the nylon felt 12 under maximum local impact conditions. Normally, the invention contemplates that a suitable plastic material will make up the film 14. In this category, would be polyvinyl chloride, polyethylene, nylon and certain other plastics. It has been found that thermoplastics are perhaps the best, but clearly any material could be utilized, even a metallic film which would be formed and expanded easily. Normally, when the film 14 is formed to its crinkled or crumpled configuration illustrated in FIG. 1, the exposed tips of the wrinkles are adhesively secured to the felt layer 12, as hereinafter described, to hold layer 14 in fixed adjacent relationship thereto.

To complete the laminate of FIG. 1, which is particularly designed for fuel tank usage, the invention contemplates a smooth inner layer, or face 16 made of a non-permeable membrane such as a synthetic polymeric amide (nylon), polyvinyl fluoride, and polyester films, etc. for general purpose fuel containment. Normally, this inner face 16 will rupture under excessive local impact, thereby allowing the crinkled layer 14 to expand unimpeded. FIG. 3 very clearly illustrates the rupturing of the layer 16 upon impact by a projectile 18. Note that in FIG. 3 the felt layer 12 and crinkled layer 14 still continue to expand to spread the kinetic energy of impact over a large area to effectively cushion the impact of and contain the projectile.

The invention contemplates that the thickness of the material utilized in forming the layer 14 will be between about .5 mil and about 50 mils depending upon the number of crinkles and the spacing thereof. Naturally, with the crinkles being very close together and of variable height, the layer 14 will have to be relatively thin. For use with conventional aircraft fuel tanks, it is found that a layer approximately 2 mils in thickness is quite desirable. The impervious inner liner 16 is preferably in a range from about 2 mils to about 20 mils. As can be seen in FIG. 1, with the layer 14 in the crinkled condition the thickness thereof becomes approximately the same or even greater than the thickness of the felt layer 12. If it is desirable to have the laminate of less thickness to avoid bulk and size where that is a limiting criteria, the layer 14 can be compressed as indicated in FIG. 2. Normally, this compression is accomplished simply by placing pressure on the outside surface of layer 16 and pressing it towards the felt layer 12. The invention contemplates that if suitable heat is applied at the same time so that the layer 14 is brought above its deformation temperature briefly during the compression, it will remain in the compressed condition yet still exhibit the expansion characteristics of FIG. 3 necessary to achieve the objects of the invention. For a sheet of polyethylene, this might be 160° F., and about 200° F. for nylon, for example, and the compressed condition of crinkled or irregular layer 14 might be 6 mils in thickness where an original flat material 2 mils in thickness was utilized.

The bonding of the inner layer 16 to the crinkled layer 14 is normally with a suitable resin adhesive which will fail and allow the crinkled layer 14 to expand in the manner indicated in FIG. 3 when a projectile attempts to pierce therethrough. For example, a suitable polysulphide rubber based adhesive could meet this desired requirement.

Particular attention should be paid to FIG. 3 which shows the projection 18 impacting with a high localized kinetic energy onto the laminate. The ballistic felt layer 12 already possesses those properties to effectively distort and spread multi-laterally upon a local impact so that it thins out and effectively spreads the kinetic energy impact to a much larger area. In the same manner, the crinkled layer 14 spreads with the same multi-lateral expansion ratio as the felt 12 to back up and enhance the energy spreading characteristics of the laminate. Great energy absorbing qualities are experienced with such laminate which represent in a lightweight, inexpensive structure a considerable improvement over the prior art.

At least certain of the objects of the invention are achieved by utilizing the crinkled layer alone, as it is impervious, and it has been found if this layer is bonded, for example to only a dry cloth to facilitate handling thereof and prevent dirt accumulation in the folds of the crinkle, that it gives a very beneficial result.

While in certain applications, both the crinkled layer 14 and the felt layer 12 may be compressed to eliminate bulk, it has been found that perhaps a little bit better penetration defeating capability is achieved in a non-compressed relationship for both layers 12 and 14. In effect, this construction as shown in FIG. 1 has less resistance to spreading whereby it more easily spreads the kinetic energy over a larger area thus providing better damping characteristics. Further, with fluid contained inside a tank made from the laminate of FIG. 1, there may be great fluid pressures from within caused by jostling or shaking of the tank which would allow these pressures to in effect compress both the crinkled layer 14 and/or the felt layer 12 before rupturing the tank from the inside out. Thus, high hydraulic pressures which will occur within the tank are a definite consideration to be taken into account when deciding whether to compress the laminate or not.

FIG. 4 clearly shown the spreading characteristics of the crinkled layer 14, and how it is fabricated from the flat, through the crinkled, and compressed stages. Note, in particular, the impact of a projection 18A against the compressed crinkled layer 14A, and how the spreading or unraveling of the crinkled configuration takes effect to spread the local kinetic energy of impact over a much larger area.

Naturally, for certain purposes the laminate 10 in FIG. 1 may have a layer of nylon cloth 20 covering the outer surface of the felt to act as a barrier and external chafing for the felt. The nylon felt 12 may be joined by butting and saturating with a polyurethane elastomer throughout the joined area and lapped with nylon cloth on one or both sides. Also, a sewn joint may be applicable. The layers 14 and 16 will normally be lapped and secured with suitable flexible adhesive that will bond therewith, such as neoprene resin, or a polyurethane resin.

Thus, it is seen that the objects of the invention are achieved by providing a novel crinkled membrane or layer alone or in combination with a suitable ballistic felt to greatly increase the penetration characteristics for fuel tanks, or other suitable applications. Another application might include a protective carton for dropping non-breakable goods from an airplane with a very small parachute, or even without a parachute. Such non-breakable goods might include fluids or other soft equipment which would not be broken upon jarring impact, and where the container would not rupture to discharge the contents.

While in accordance with the patent statutes only one best known embodiment of the invention has been illustrated and described in detail, it is to be particularly understood that the invention is not limited thereto or thereby, but that the inventive scope is defined in the appended claims.

What is claimed is:

1. In an impact resistant laminate the combination of:
   an outer layer of a ballistic nylon felt,
   a crinkled flexible non-permeable film positioned adjacent the belt capable of multi-lateral expansion to match that of the felt under a local impact, and
   a smooth inner non-permeable membrane covering the crinkled film and adhered thereto with a weak adhesive that will fail under the force of an impact.

2. A laminate according to claim 1 where exposed top surfaces of the crinkled film are bonded to the inner surface of the felt by a suitable adhesive agent.

3. A laminate according to claim 1 where a layer of nylon cloth covers the outer surface of the felt to act as a barrier and external protector for the felt.

4. A laminate according to claim 1 where the crinkled film is in a permanently heat formed compressed structural relationship adjacent the felt.

5. A laminate according to claim 1 where both the crinkled film and felt are in a compressed structural condition, and including means bonding them together.

6. An impact resistant material comprising a crinkled flexible non-permeable film reduced in planar area size by the crinkling so as to be capable of multi-lateral expansion under a local impact, the crinkled film comprising a thermoplastic material selected from the group consisting of polyvinyl chloride, polyethylene, and nylon, said film being in a heat formed compressed flattened physical condition after it is crinkled, a layer of ballistic nylon felt adhered to the outer surface thereof, and a smooth inner non-permeable membrane covering the crinkled film and providing a smooth inner lining.

References Cited

UNITED STATES PATENTS

| | | | |
|---|---|---|---|
| 616,516 | 12/1898 | Wilson | 152—346 X |
| 2,406,679 | 8/1946 | Gray et al. | 161—404 X |
| 2,406,903 | 9/1946 | Rethorst | 244—135 X |
| 2,438,965 | 4/1948 | Dasher | 152—347 X |
| 2,531,931 | 11/1950 | Arkell | 161—128 |
| 2,697,054 | 12/1954 | Dietz et al. | 89—36 |
| 2,754,992 | 7/1956 | Wilson | 244—135 X |
| 3,129,743 | 4/1964 | Nonnamaker | 152—346 X |
| 3,320,619 | 5/1967 | Lastnik et al. | 161—404 X |

FOREIGN PATENTS

| | | |
|---|---|---|
| 323,394 | 1/1930 | Great Britain. |
| 542,019 | 12/1941 | Great Britain. |

ROBERT F. BURNETT, Primary Examiner

W. W. SCHWARZE, Assistant Examiner

U.S. Cl. X.R.

2—2.5; 89—36; 109—80; 161—148, 404; 244—135